United States Patent
Vasquez et al.

(10) Patent No.: US 9,071,681 B1
(45) Date of Patent: Jun. 30, 2015

(54) INBOUND TELEPHONY ORCHESTRATOR FOR HANGOUT-BASED CONTACT CENTER PLATFORM

(75) Inventors: Juan Vasquez, Mountain View, CA (US); Steve Osborn, Mountain View, CA (US)

(73) Assignee: Google Inc., Mountain View, CA (US)

( * ) Notice: Subject to any disclaimer, the term of this patent is extended or adjusted under 35 U.S.C. 154(b) by 274 days.

(21) Appl. No.: 13/424,076

(22) Filed: Mar. 19, 2012

(51) Int. Cl.
*H04M 1/253* (2006.01)
*H04M 11/06* (2006.01)
*H04M 7/00* (2006.01)
*H04M 17/02* (2006.01)
*H04M 7/12* (2006.01)

(52) U.S. Cl.
CPC .......... *H04M 1/2535* (2013.01); *H04M 7/0069* (2013.01); *H04M 7/0057* (2013.01); *H04M 7/006* (2013.01); *H04M 17/02* (2013.01)

(58) Field of Classification Search
CPC . H04M 1/2535; H04M 7/006; H04M 7/0057; H04M 7/0069; H04M 17/02
USPC ............. 370/352, 338, 392; 348/14.08, 14.09
See application file for complete search history.

(56) References Cited

U.S. PATENT DOCUMENTS

| | | | |
|---|---|---|---|
| 5,854,893 A | 12/1998 | Ludwig et al. | |
| 6,237,025 B1 | 5/2001 | Ludwig et al. | |
| 7,054,904 B2 | 5/2006 | Ludwig et al. | |
| 7,185,054 B1 | 2/2007 | Ludwig et al. | |
| 7,206,809 B2 | 4/2007 | Ludwig et al. | |
| 7,711,095 B2 | 5/2010 | Erhart et al. | |
| 7,769,148 B2 | 8/2010 | Erhart et al. | |
| 7,778,397 B2 | 8/2010 | Erhart et al. | |
| 8,644,218 B1* | 2/2014 | Pankajakshan et al. | 370/328 |
| 2003/0059021 A1* | 3/2003 | Meyerson et al. | 379/219 |
| 2003/0202088 A1 | 10/2003 | Knight | |
| 2004/0119814 A1* | 6/2004 | Clisham et al. | 348/14.08 |
| 2006/0285662 A1 | 12/2006 | Yin et al. | |
| 2007/0106783 A1* | 5/2007 | Pearson et al. | 709/224 |
| 2009/0240829 A1* | 9/2009 | Hildebrand | 709/232 |
| 2009/0287790 A1 | 11/2009 | Upton et al. | |
| 2010/0064334 A1 | 3/2010 | Blackburn et al. | |
| 2010/0246802 A1* | 9/2010 | Valdez | 379/392.01 |
| 2011/0249081 A1 | 10/2011 | Kay et al. | |
| 2011/0261144 A1 | 10/2011 | Benefield et al. | |
| 2011/0295943 A1* | 12/2011 | Peuziat et al. | 709/203 |
| 2012/0246212 A1* | 9/2012 | Ahmad et al. | 709/201 |

* cited by examiner

*Primary Examiner* — Charles C Jiang
*Assistant Examiner* — Will Lin
(74) *Attorney, Agent, or Firm* — Leydig, Voit & Mayer, LTD.

(57) ABSTRACT

A system and method are provided for receiving inbound conventional calls and establishing real-time interconnectivity in a multimedia production environment. The system may include: a signaling unit; a contact center bell application, a particular reflector associated with a virtual hangout, and a contact center manager application. The system may further include a room manager application. The method may include: transmitting a call request to the integration unit, wherein call information corresponding to the call request is sent to the contact center manager; and connecting to the communications session, which corresponds to a virtual hangout identification received by the integration unit from the contact center manager based on the call information.

20 Claims, 8 Drawing Sheets

INBOUND TELEPHONY ORCHESTRATOR FOR HANGOUT-BASED CONTACT CENTER PLATFORM

BACKGROUND

Face-to-face or in-person interactions among groups of individuals allow each individual to observe the behavior, mood, expressions, tone and the like of the other individuals in the group. Group interactions can facilitate relationship building by the creation of shared experiences. Traditionally, such group interactions were restricted to in-person congregations of the group. With all of the individuals together, they are able to share experiences like mutually participating in interactive sessions or audio/visual presentations. The camaraderie can be substantial and long lasting.

More recently, face-to-face group meetings among participants at remote locations have been permitted with live video and audio feeds of each of the participants. Both personal computers (PCs) and personal digital assistants (PDAs) are now commonly equipped with both microphones and video cameras that provide the basic resources for creating a shared sessions among a group of individuals with PCs or smart phones.

Such video meetings rely on Internet-based communication protocols such as "Voice over IP" (VoIP). Streams of video and audio packets are created, transmitted across the internet, and decoded and reassembled in a manner permitting each recipient to hear and see the other participants in a face-to-face manner.

In contrast, conventional communication systems such as the public switched telephone network (PSTN) and private branch exchange (PBX) systems continue to be the primary communications resource for large percentages of the general population. Such systems are based on switched networks that connect one location to another. Typically, such systems transmit voice signals between two termination points.

While an individual who wishes to establish an audio or an audio/visual conference may have several alternatives available to them. Audio/visual communications with a group of others has often been the domain of the internet. Alternatively, audio communications are typically the domain of the PSTN. And, these options are often not compatible with one other. For example, a group interacting in a particular VoIP multimedia communication environment is unable to communicate, using that environment, with other individuals that only have access to voice-only PSTN-compatible devices.

SUMMARY

According to an embodiment, a server system is provided connecting to one or more clients and providing virtual hangouts supporting real-time multimedia sessions. The server system is capable of receiving inbound conventional calls or "Plain Old Telephone Service (POTS) and establishing real-time interconnectivity with the real-time multimedia sessions and the one or more clients. The server system includes: a signaling unit connected to a conventional phone network and configured to receive a conventional inbound phone call from a conventional phone client through the conventional phone network, the signaling unit configured to transform conventional phone signals received from the conventional phone client into an internet protocol phone signal stream; a contact center bell application connected to the signaling unit, the contact center bell application configured to produce a phone call identifying signal including identifying information particular to the conventional inbound call; a particular reflector associated with a virtual hangout, the particular reflector being one of a plurality of reflectors, the particular reflector being capable of connecting with the contact center bell application to receive internet protocol phone signal streams, the particular reflector further capable of combining the internet protocol phone signal streams with at least one other multimedia signal stream and broadcasting combined multimedia signals in a real-time session to particular client devices corresponding to the virtual hangout; and a contact center manager application connected to the contact center bell application, the contact center manager application configured to (a) receive the phone call identifying signal, (b) process the phone call identifying signal and (c) transmit an identification signal that identifies the particular reflector associated with the virtual hangout, wherein the contact center bell is further configured to establish a connection between the signaling unit and the particular reflector associated with the virtual hangout based on the identification signal so that the internet protocol phone signal streams are received by the particular reflector, combined with the at least one other multimedia signal streams, and broadcast to the particular client devices corresponding to the virtual hangout.

In a further embodiment, the server system further includes: a room manager application residing on or in connection with the server system and connected to the contact center bell application and the contact center manager application, the room manager application being configured to transmit the identification signal that identifies the particular reflector associated with the virtual hangout to the contact center manager application.

According to another embodiment, a method performed by a conventional phone client is provided for integrating a conventional inbound phone call into a communications session within a multimedia production environment including a contact center manager, an integration unit, and a reflector. The method includes: transmitting a call request to the integration unit, wherein call information corresponding to the call request is sent to the contact center manager; and connecting to the communications session, which corresponds to a virtual hangout identification received by the integration unit from the contact center manager based on the call information, by receiving audio content that includes a consolidated audio stream converted to a format compatible with the conventional phone client, wherein the consolidated audio stream is based on a set of a plurality of data streams received and processed by the reflector and the data streams received by the reflector correspond to the virtual hangout identification.

DETAILED DESCRIPTION

Figure 1:
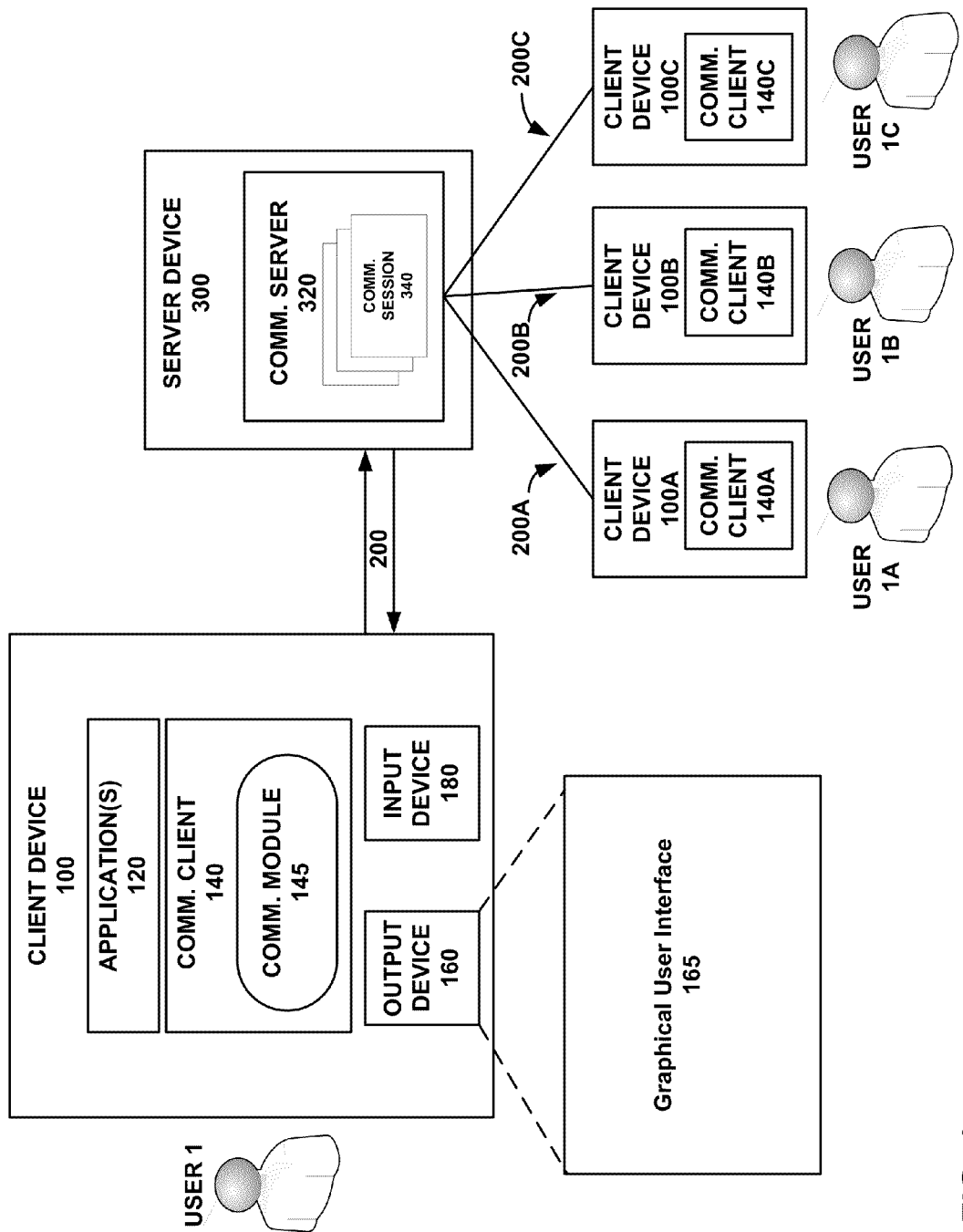
FIG. 1 is a block diagram of an example system supporting a multimedia production environment, including a plurality of client machines interacting through a common communications session hosted by a server resource.

A multimedia production environment provides a mechanism for two or more individuals to interact in the same virtual location, which may be described as a "virtual hangout." A virtual hangout supports multiple users, using diverse communication tools, to interact, collaborate, and/or share information and experiences in the same virtual environment. In an Internet environment, the virtual hangout is hosted by one or more servers that support communications sessions with user machines equipped with resources such as microphones and video cameras. For example, individuals participating in a virtual hangout may share and watch videos, play games, participate in video, audio, or text chat, surf the web, seek or provide assistance regarding a particular problem, or any combination thereof. In other words, a virtual hangout is where individuals may share an experience substantially similar to interacting in person at the same physical location.

When an individual desires to interact with a group of others in a virtual environment, the individual employs a client device to either initiate a virtual hangout session or join an existing virtual hangout session. When establishing a new virtual hangout session, the individual invites others to join the session. Typically, to join an existing virtual hangout session, each participant must be invited. Invitations may be delivered in many different manners including via e-mail or text messaging services. An individual can request joining an existing hangout session even though he or she has not received an invitation, assuming the URL for the session is known. Additionally, individuals participating in a virtual hangout session may cause the session to link to external resources and integrate those external resources into the participates graphical user interface (GUI).

In an example embodiment, a hangout is provided with the ability to cross connect to sources outside of the internet environment. As indicated, in one embodiment, a hangout may be attended by others with internet access. Audio/visual connections to the hangout may be established through address connections and communication sessions established by publishing and sharing content at an established URL. In example embodiments, such connections are permitted to cross technology boundaries and establish inbound connections from other platform technologies such as the PSTN and the like. Such example embodiments include a portal of phone numbers that may be dialed and connected to by a potential new entrant to a hangout session. As a user calls a phone number, an example embodiment permits the call to be analyzed for content and characteristics. Such embodiments permit the conventional call signal platform to be translated into another signal platform specified by the hangout protocol. The translated audio stream and the characteristics of the call are then isolated by a contact center bell (CCB) and communicated to an application manager.

In an example embodiment, a CCB establishes a two-way media path with the originating party while it communicates call details with a contact center manager (CCM). The CCM may then process the information provided and identify or establish a Jabber Identifier (JID) or similar network connection identifiers. In the embodiment utilizing JID, communicated information may include a node identifier, a domain identifier and a resource identifier. Based upon such information, a hangout room is identified as a new or existing multimedia communication location. In communication with other applications, the incoming call, having been translated to an internet platform, is connected with a reflector permitting multiple streams of information to be communicated to the hangout. In one example, the incoming call is converted to a VoIP format by the carrier (e.g., a two-way Real-time Transfer Protocol (RTP) stream with Session Initiation Protocol (SIP) signaling). The CCB may further transform incoming calls to a format compatible with the multimedia production environment (e.g., taking an incoming PSTN or VoIP call and transforming it specifically to XMPP signaling with multiple RTP streams). The audio signals being sent to participants of the hangout are separately processed and consolidated into individual audio streams using standards such as the G.711 standard. Such signals are decoded into appropriate PSTN or similar signals and transmitted back to any individuals utilizing such methods of connection.

An example multimedia production environment is described in detail with respect to FIGS. 1-5. The illustrated environment is presented as an example, and does not imply any limitation regarding the use of other group networking environments. To the contrary, the description contemplates all implementations of multimedia production environments that have the capability to integrate conventional calls into the multimedia production environment.

Turning to FIG. 1, one or more client devices is connected to a communication session supporting a multimedia production environment that enables communication among the users of the client devices. Examples of client devices 100 and 100A-C include, but are not limited to, portable, mobile, and/or stationary devices such as landline telephones, mobile telephones (including "smart phones"), laptop computers, tablet computers, desktop computers, personal digital assistants (PDAs), portable gaming devices, portable media players, and e-book readers. In some embodiments, two or more client devices are the same type of device. For example, client devices 100 and 100A may both be mobile telephones. In other embodiments, two or more client devices are different types of devices. For example, client devices 100 and 100A may both be mobile telephones and client device 100B may be a desktop computer.

In the embodiment illustrated by FIG. 1, the client device 100 communicates with a server device 300 via a communications channel 200. The communications channel 200 typically includes an Internet connection between the client device 100 and the server device 300 in an example embodiment. The server device 300 often comprises multiple physical servers such as a communications server 320 for maintaining or "hosting" one or more communication sessions, such as communication session 340. Of course, each server can be a physically separate machine or it can be different processes running within the same physical machine.

One or more of the communication sessions are virtual hangouts. In another embodiment, the client device 100 maintains or hosts a communication session and other client devices such as client devices 100A-C in FIG. 1 are routed to the communication session at the client device 100 by server device 300 or directly connect to the client device 100 via an ad-hoc network or the like. Additionally, while depicted as a single device in FIG. 1, in some embodiments server device 300 includes a plurality of interconnected devices maintained at different physical locations.

Communications or hangout sessions 340 at the communications server 320 are supported by an environment defined by a runtime engine executing at the server. For example, the run time engine may be Google's "App Engine." The runtime engine provides the platform for the hangout session and supplies resources required for user interaction. The resources of the application engine are available to the hangout session by way of an application programming interface (API).

The client device 100 of FIG. 1 includes application(s) 120, communications client 140, output device 160 (e.g., a display), and input device 180 (e.g., keyboard, mouse, touch screen). Application(s) 120 provide the client device 100 with a variety of functionality. Examples include social media functionality, web browsing capabilities, calendars, contact information, games and document processing. Generally, application(s) 120 employ the output device 160 to display information at a graphical user interface (GUI) 165.

The communications client 140 further includes a communications module 145 that enables output device 160 to display information at the GUI 165. The communications module 145 also enables the communications client 140 to connect to the communications server 320, allowing user 1 in FIG. 1 to establish or join a hangout session. Typically, the communications module 145 is a network module that connects the client device 100 to a network such as the Internet using one of a variety of available network protocol techniques. Two or more client devices 100 and 100A may join the same communications session 340 hosted at the server 320. Through the communications session 340, the communications module 145 at the client device 100 enables the user 1 to invite other users to the join the session.

Once a communications session 340 is established, a communications channel 200 between the communications client 140 and the communications server 320 exchanges data, such as audio, video, text, and/or other information. In some embodiments, the data exchanged between the communications client 140 and the communications server 320 is optimized based, at least in part, on the hardware and/or software capabilities of client device 100. For example, if the client device 100 is a mobile device connecting through to the session 340 by way of a bandwidth limited path such as a cellular network, communications server 320 may optimize the number and quality of the audio, video, text, and/or other information sent to client device 100. Furthermore, communications client 140 may dynamically adjust the bit rate required to send the information to communications server 320 by, for example, reducing the quality of the audio, video, text, and/or other information being sent to communications server 320.

GUI 165 is an illustrative example of a GUI from which a virtual hangout may be initiated and sustained. In the illustrated embodiment, GUI 165 includes information about one or more other users connected to user 1 by the communications session 340. The GUI may also include information about other hangouts user 1 may join, notifications of events or invitations and other information relevant to user 1.

After a communications session 340 or hangout is created by a user, other users may join following a request-approve process. For example, user 1 may send a request to user 1A requesting to be connected to user 1A's hangout session. In order to complete the request, user 1A chooses to either accept or deny the request. Upon accepting the request, communications session 340 connects user 1 into the hangout session initiated by user 1A. In some instances, user 1A grants permission to user 1 to view personal information entered by user 1A, posts created by user 1A, or other users connected to user 1A.

The GUI may also support the ability to broadcast the availability of a session or hangout to a circle of friends defined by each user. The GUI of each friend identifies the available hangout session and the client includes URL information that allows the user to join the hangout if desired. Each client may include multiple circles of friends with each defined by social attributes. For example, one circle of friends may be friends established from a common working relationship. Another circle of friends may be friends established from familial relationships. Another circle of friends could be friends established from a common educational background or experience. The GUI supports invitations to individuals or to one or ore circles of friends.

Also, each circle of friends may be associated with a different profile of permissions or privileges through the GUI such that the circle is able to view a different subset of information about the user. A friend can be included in more than one circle. In that case, the GUI allows the user to determine whether the broadest or narrowest set of permissions or privileges of the circles to which the friend belongs are given to the individual friend.

As shown in FIG. 1, client devices 100A-C include communications clients 140A-C, respectively, that enable users 1A-C to join one or more of the hangouts or communication sessions 340. Each of the communications clients 140A-C includes the same or similar functionality as the communications client 140.

In order to establish or join a virtual hangout, user 1 interacts with GUI 165 to cause communications client 140 to generate a request to create a new communications session 340 or join an existing communications session. For example, GUI 165 includes a "Create Hangout" button that user 1 activates in order to create a new hangout. In response to user 1 activating the Create Hangout button, communications client 140 sends a request to initiate a new communications session 340 to communications server 320, which establishes a new virtual hangout.

User 1 may invite additional users to the hangout session, such as users 1A-C in FIG. 1, while the virtual hangout is being instantiated or anytime thereafter. At the GUI 165, user 1 selects individual friends or one or more different circles of friends to join the hangout. The selected friends are sent invitations via various conventional means such as text messaging and e-mail. The invitations include all information required for the invited friend to find and join the hangout session.

For example, to join an existing hangout or communications session 340, the user 1 selects a "join link" icon at the GUI 165 and selects a hangout from a displayed list of available hangouts at the GUI or selects a "join link" icon displayed in an external source such as an instant message or posting. However communicated to the user, in response to user 1 initiating an attempt to join an existing virtual hangout session, communications client 140 sends a request to join the virtual hangout to the communications server 320. The request includes an identifier of the particular communication session 340 associated with the virtual hangout. The identifier may be included in the join link for the virtual hangout. Communications server 320 connects communications client 140 to the specified communication session 340.

Figure 2:
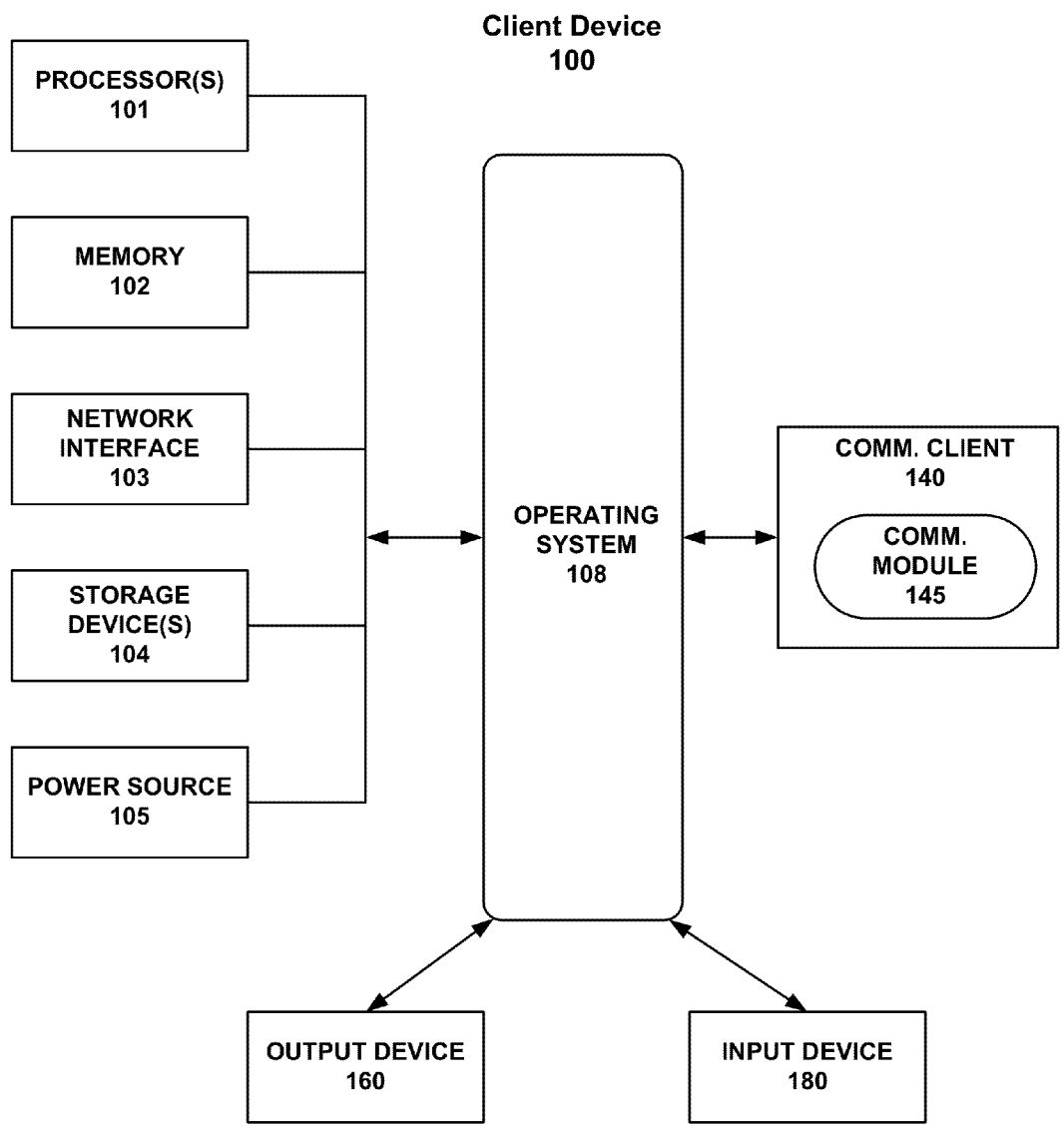
FIG. 2 is a block diagram of example functional components for one of the client machines in FIG. 1.

Referring now to FIG. 2, one particular example of client device 100 is illustrated. In general, many other embodiments of the client device 100 may be used as long as they support at least limited participation in the hangout sessions. In the illustrated embodiment of FIG. 2, the client device 100 includes one or more processors 101, memory 102, a network interface 103, one or more storage devices 104, power source 105, output device 160, and input device 180. The client device 100 also includes an operating system 108 and a communications client 140 that are executable by the client. In a conventional fashion, each of components 101, 102, 103, 104, 105, 160, 180, 108, and 140 are interconnected physically, communicatively, and/or operatively for inter-component communications.

As illustrated, processors 101 are configured to implement functionality and/or process instructions for execution within client device 100. For example, processors 101 execute instructions stored in memory 102 or instructions stored on storage devices 104. Memory 102, which may be a non-transient, computer-readable storage medium, is configured to store information within client device 100 during operation. In some embodiments, memory 102 includes a temporary memory, area for information not to be maintained when the client device 100 is turned off. Examples of such temporary memory include volatile memories such as random access memories (RAM), dynamic random access memories (DRAM), and static random access memories (SRAM). Memory 102 is maintains program instructions for execution by the processors 101.

Storage devices 104 also include one or more non-transient computer-readable storage media. Storage devices 104 are generally configured to store larger amounts of information than memory 102. Storage devices 104 may further be configured for long-term storage of information. In some examples, storage devices 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 100 uses network interface 103 to communicate with external devices via one or more networks, such as one or more wireless networks. Network interface 103 may be a network interface card, such as an Ethernet card, an optical transceiver, a radio frequency transceiver, or any other type of device that can send and receive information. Other non-limiting examples of network interfaces include Bluetooth®, 3G and WiFi® radios in mobile computing devices, and USB. In some embodiments, the client device 100 uses network interface 103 to wirelessly communicate with an external device such as the server device 300 of FIG. 1, a mobile phone, or other networked computing device.

The client device 100 includes one or more input devices 180. Input device 180 is configured to receive input from a user through tactile, audio, and/or video feedback. Non-limiting examples of input device 180 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 160 are also included in client device 100. Output device 160 is configured to provide output to a user using tactile, audio, and/or video stimuli. Output device 160 may include a display screen (part of the presence-sensitive screen), a sound card, a video graphics adapter card, or any other type of device for converting a signal into an appropriate form understandable to humans or machines. Additional examples of output device 160 include a speaker, a cathode ray tube (CRT) monitor, a liquid crystal display (LCD), or any other type of device that can generate intelligible output to a user.

The client device 100 includes one or more power sources 105 to provide power to the client. Non-limiting examples of power source 105 include single-use power sources, rechargeable power sources, and/or power sources developed from nickel-cadmium, lithium-ion, or other suitable material.

The client device 100 includes an operating system 108 such as the Android® operating system. The operating system 108 controls operations of the components of the client device 100. For example, the operating system 108 facilitates the interaction of communications client 140 with processors 101, memory 102, network interface 103, storage device(s) 104, input device 180, output device 160, and power source 105. As illustrated in FIG. 2, communications client 140 includes communications module 145. Each of communications client 140 and communications module 145 typically includes program instructions and/or data that are executable by the client device 100. For example, in one embodiment communications module 145 includes instructions causing the communications client 140 executing on the client device 100 to perform one or more of the operations and actions described in the present disclosure.

In some embodiments, communications client 140 and/or communications module 145 form a part of operating system 108 executing on the client device 100. In other embodiments, communications client 140 receives input from one or more of the input devices 180 of the client device 100. Communications client 140 preferably receives audio and video information associated with a communications session 340 (e.g., a virtual hangout) from other client devices participating in the communication session.

Figure 3:
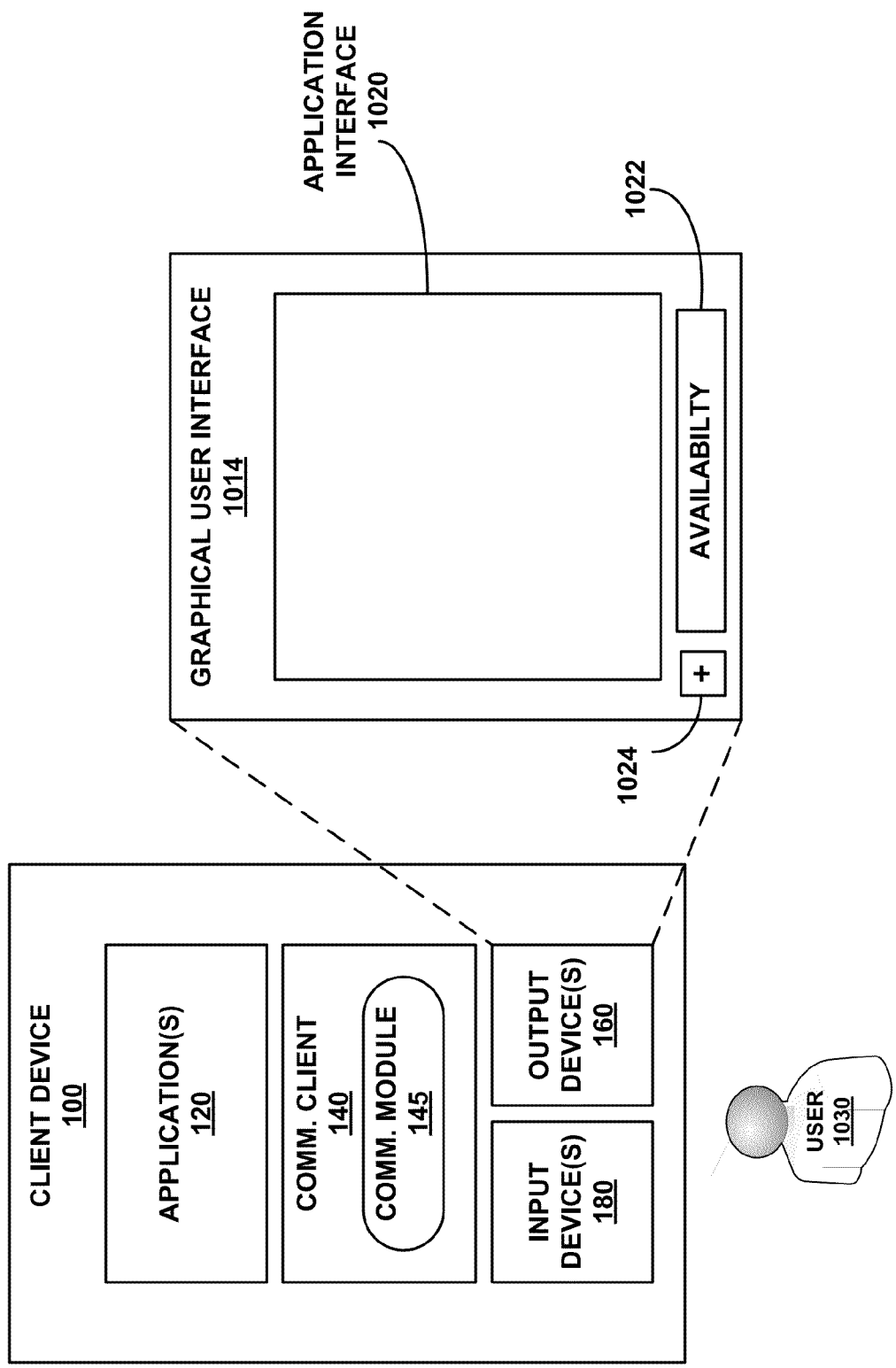
FIG. 3 is an example application level block diagram of the client machine in FIG. 2, illustrating example executable components supporting at the client a group interaction experience within the multimedia production environment.

FIG. 3 illustrates an example configuration of the client device 100 when it creates an ambient communication session—e.g., an ambient hangout. An ambient hangout is a hangout that is inactive—i.e., a hangout session current users. In some instances, an ambient hangout provides only a subset of the functionality, features, or aspects as compared with an "active" hangout—i.e., a hangout session in which at least one user is connected. In one example, a hangout that is partially initiated is an ambient hangout.

The communications module 145 initiates a hangout session from the client device 100 and maintains the session with the communications session 340 at the server 320 while the client performs other tasks. Once one or more other users join the hangout session, the application engine at the server 320 may provide additional services to the session that supports interaction among users.

The client device 100 can maintain one or more ambient hangouts in its background. By maintaining the ambient hangouts in its background, the client device 100 saves computing resources including power, bandwidth, processor speed, memory and the like. While a hangout is ambient, user 1 is able to use other features or applications of the client device 100, such as application(s) 120. As shown in FIG. 3, GUI 165 displays application interface 1650. Application interface 1650 allows user 1 to use and interact with application(s) 120, which in one embodiment can be a internet browser such as Internet Explorer®. For example, while client device 100 maintains an ambient hangout in its background, user 1 may interact with application interface 1650 to view social media, browse the web, view a calendar and/or contacts, play games, process documents, or any other function performed by a computing device such as client device 100. In some examples, application interface 1650 is a graphical display that is not interactive.

The communications module 145 causes GUI 165 to display a user-selectable icon 1652. Non-limiting examples of the icon 1652 are a virtual or graphical button, such as a key of a virtual keyboard, a touch-target, a physical button of client device 100, or a button on an input device 180 coupled to client device 100, such as a mouse button, a button on a mobile device, or a key of a keyboard. Of course, GUI 165 may include other graphical controls as well.

In FIG. 3, communications module 145 is also configured to cause GUI 165 to display an availability indication 1651. The availability indication 1651 indicates to individual friends and/or circles whether user 1 is available to engage in a communication session 340. The availability of user 1 is communicated to selected friends. In some instances, availability indication 1651 indicates that user 1 is not currently available for a communication session. Other times, availability indication 1651 indicates that user 1 is currently available for a communication session. In some embodiments, availability indication 1651 is only present in GUI 165 when user 1 enables it. In some embodiments, availability indication 1651 is only displayed when the communication session is ambient and not when user 1 is engaged in the communication session. Availability indication 1651 may be a graphical icon or shape, such as a small circle, whose visual properties change between user 1 being available and being unavailable. For example, availability indication 1651 may be a shape that is red when user 1 is unavailable to hangout and green when user 1 is available to hangout. Alternatively, availability indication 1651 is not present, regardless of whether an ambient communication session has been initiated.

In some embodiments, user 1 interacts with a social media application, such as web-based application 120 supported by an Internet browser application, where a list of user 1's contacts is provided, such as in a list of icons or thumb images. Each friend may be associated with an indication similar to availability indication 1651 that informs user 1 if the friend is available for or desires to engage in a hangout session. If the friend is available to hangout in a communication session 340, the indication includes an attribute informing the user that the friend is online and available to hangout. If the friend is offline or otherwise unavailable, an attribute of the indication informs the user that the friend is unavailable. In some embodiments, user 1 is able to see information of other users who are not in a friend list of user 1. Alternatively, a friend only shows up on the list if the friend is either available or online.

User 1 may toggle or select icon 1652 in order to indicate that user 1 is available or unavailable for a communications session 340. Availability indication 1651 is then displayed on output device 160, or availability indication 1651 changes to reflect availability of user 1. In contrast, if user 1 was previously available and toggles icon 1652, availability indication 1651 shows that user 1 is unavailable. Toggling or selecting icon 1652 causes communications client 140 to issue a signal indicating to other computing devices that user 1 is available to participate in a communication session. In some instances, the signal is broadcasted to a circle of contacts of user 1.

As described, user 1 may be using application(s) 120 while communications module 140 operates an ambient hangout in the background of the client device 100. When the hangout session initiated by user 1 is an ambient hangout, he is not active in the hangout. As soon as a second user enters the hangout, the communications session 340 supporting the hangout provides full functionality to the hangout session and it ceases to be an ambient hangout. In other examples, the hangout is ambient only if user 1 is not currently participating in the hangout.

Figure 4:
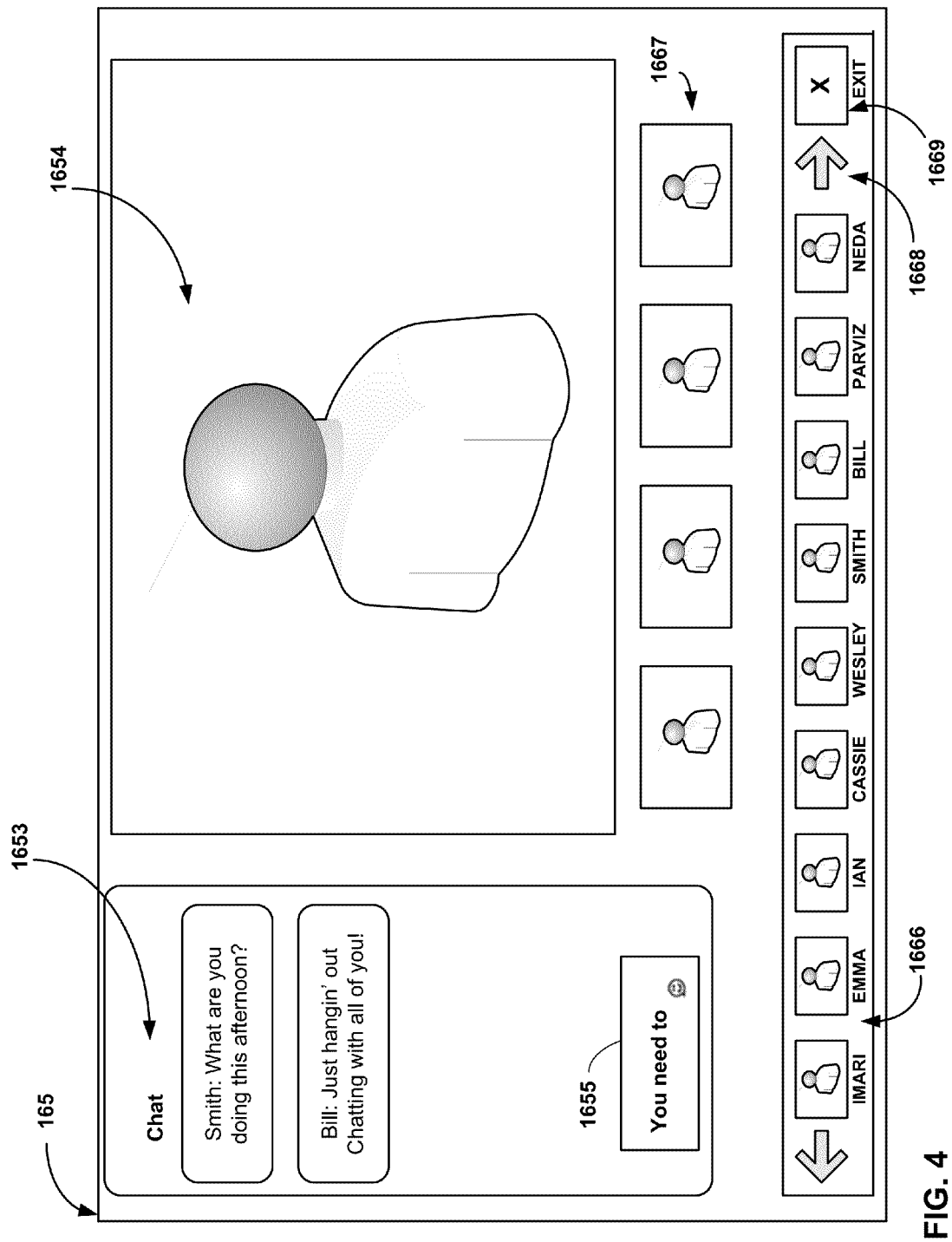
FIG. 4 is an example graphical user interface at the client machine of FIGS. 2 and 3 available to a user for the group interaction experience.

The graphical user interface (GUI) of FIG. 4 is an example of the GUI 165 of client device 100 of FIGS. 1 and 3. However, the graphical display of FIG. 4 may be outputted using other devices. A client application supporting hangout sessions is typically contained within an internet browser session. The application exposes a number of features to the user through the GUI. These graphically displayed features include a video display 1654 of one or more participants in the hangout. A chat feature 1653 is also provided, including a chat history and a field 1655 where a user can, such as user 1, input text to the chat conversation. GUI 165 is also configured to display graphical images 1667 that are associated with participants in the hangout. Graphical images 1667 include images of users currently participating in the hangout.

In the example GUI 165, a live bar 1666 provides information to user 1, including information describing the availability of friends or other users or contacts to join the hangout. In one embodiment, live bar 1666 is a scrollable bar that displays graphical images associated with contacts or other users who may be currently available to hang out in a communication session. Selection of one of the graphical images sends an invitation to join the hangout to the user associated with that image. In some embodiments, live bar 1666 is updated in real-time to reflect actual availability of the users displayed. The users displayed on live bar 1666 may be displayed as graphical still photos (for example, icons) or with a live video feed if the user has a camera enabled. The example GUI 165 includes additional a user selectable button 1669, which functions to toggle live bar 1666 between being displayed and hidden. Buttons 1668 allows the user to scroll through the different users.

Figure 5:
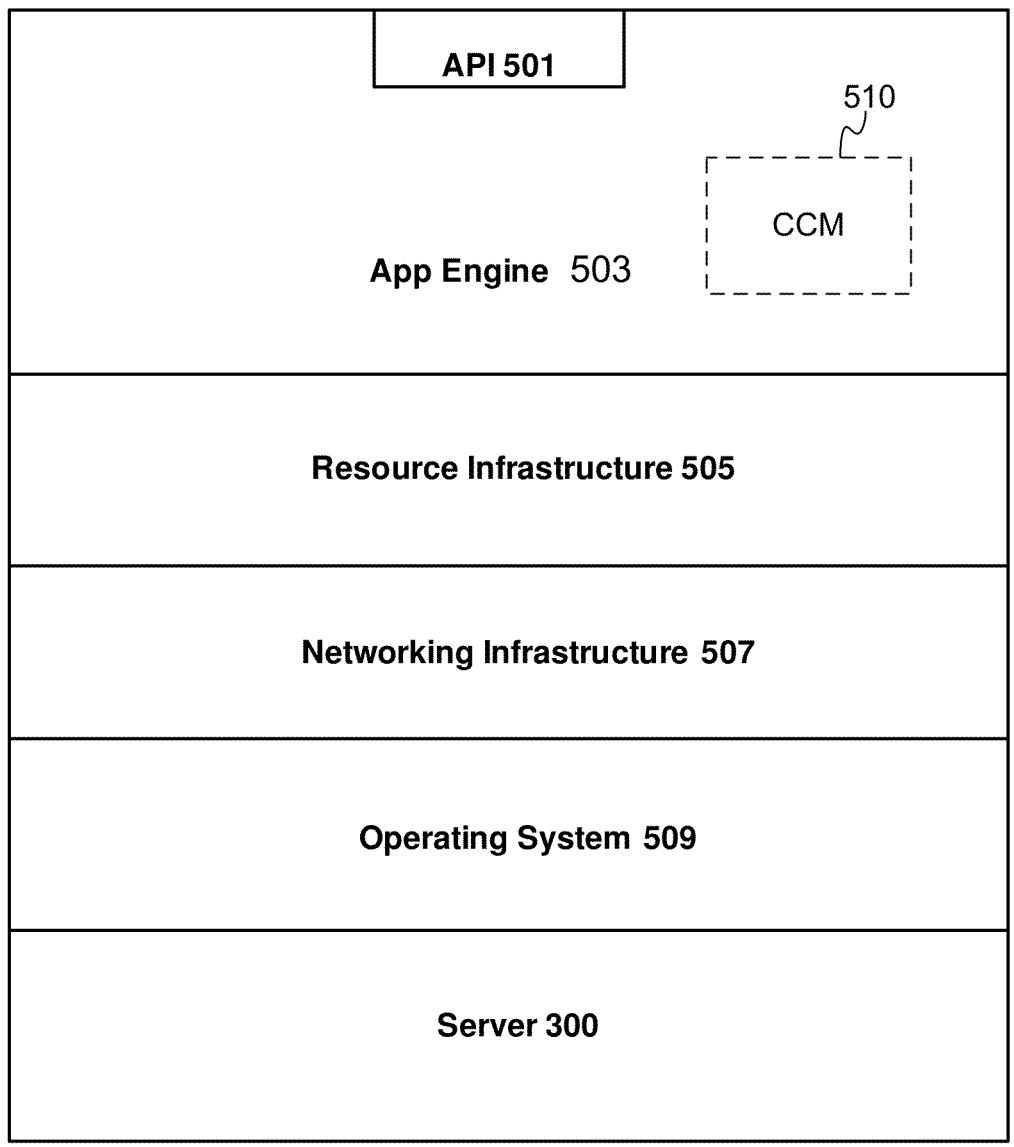
FIG. 5 is an example block diagram of an application at the server of FIG. 1 that supports the multimedia production environment and interaction among the client machines through their respect graphical user interfaces.

Referring to FIG. 5, in one embodiment, an application programming interface (API) 501 of an Application Engine or App Engine 503 provides many resources to the communications session 340 (e.g., a hangout session). In turn, the App Engine 503 depends on resources provided from an API exposed by an Resource Infrastructure Layer 505 and a Networking Infrastructure Layer 507, which are supported by the communications servers 320 and their Operating Systems 509. The App Engine 503 and the Resource Infrastructure Layer 505 connect HTTP requests from the user to the communications sessions 340. The App Engine 503 also provides a runtime environment for the communications sessions 340. Administrative support for the communications sessions 340 are provided by a Contact Center Module (CCM) 510 in the App Engine 503 as described in greater detail hereafter in connection with FIG. 6. The App Engine 503 also provides access to a database in the Resource Infrastructure Layer 505 for persistent storage requirements of the communications sessions 340.

Through its API 501, the App Engine 503 provides the communications sessions 340 access to resources on the Internet, such as web services or other data. The App Engine 503 retrieves web resources using the Resource Infrastructure Layer 505. The communications session 340 also sends and receives messages using the App Engine 503 and the Resource Infrastructure Layer 505. The App Engine 503 and the Resource Infrastructure Layer 505 also supports a cache, which is useful for temporary data or data copied from the datastore to the cache for high speed access. The Resource Infrastructure Layer 505 also supports a file system and scheduling resources. An example of the App Engine, Google's App Engine. An example of the Resource Infrastructure Layer 505, the Networking Infrastructure Layer 507 and the Operating System 509 is Google's supporting infrastructure and operating system for its App Engine.

Figure 6:
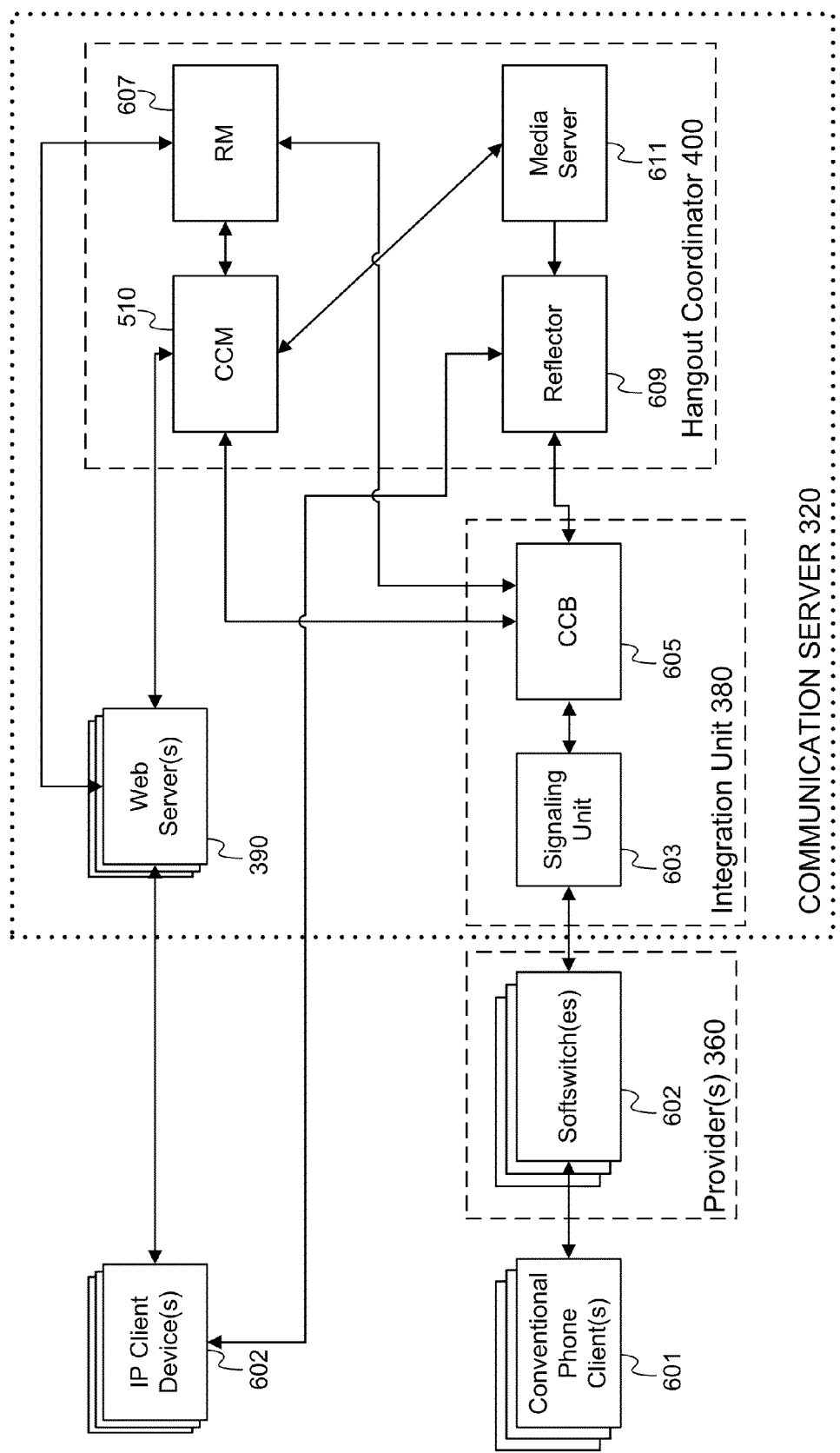
FIG. 6 is an example block diagram of a system architecture for integrating a call into a multimedia production environment according to an example embodiment.

Given the example environment depicted in FIGS. 1-5 and turning now to FIG. 6, a block diagram 600 is depicted illustrating an architecture according to an example embodiment for establishing hangouts among IP client devices 602 (i.e., client devices capable of communicating over VoIP) and conventional phone clients 601 (e.g., landline telephones and cellular phones utilizing voice-only functionality). In the context of IP client devices such as a smart phones or personal computing devices, a connection is established to one or more web servers 390 which interface with a CCM 510 and a RM 607. The one or more web servers 390 provide control signaling with respect to incoming VoIP calls in order to assign the call to an appropriate location. It will be appreciated that the one or more web servers 390 may be a part of the communication server 320 (as depicted) or separate from the communication server 320.

In the case of conventional phone clients 601, inbound calls are connected to an integration unit 380 of the communication server 320 via one or more softswitches 602 maintained by one or more providers 360 (such as cellular network carriers). It will be appreciated that the one or more softswitches need not be provided by the one or more providers 360 and may be incorporated into the integration unit 380 or elsewhere. The integration unit 380 includes a signaling unit 603 that establishes a two-way call path between the conventional phone clients 601 and the communication server 320 via a conventional phone network maintained by the one or more providers 360. The signaling unit 360 further transforms conventional phone signals received from the conventional phone clients 601 to internet protocol phone signal streams such as VoIP format. In one example embodiment, the signaling unit 603 utilizes SIP and includes open source IP telephony servers and applications such as FreeSWITCH, Open SIPS, YATE, and Asterisk. The CCB 605 is also part of the integration unit 380 and receives call information from the signaling unit 603, works together with the CCM 510 and Room Manager (RM) 607 to assign incoming calls from conventional phone clients 601 to appropriate virtual hangouts, and processes RTP streams received from a reflector 609 for transmission to the conventional phone clients 601.

The hangout coordinator 400, which is responsible for maintaining the virtual hangouts and providing content to devices connected to a virtual hangout, includes the CCM 510 as described above, the RM 607, the reflector 609, and a media server 611. FIG. 6 only depicts a particular reflector 609 corresponding to a particular virtual hangout, but it will be appreciated that a plurality of reflectors may reside on communication server 320. While FIG. 6 depicts all these modules as being a part of communications server 320, it will be appreciated that the implementation of these modules may be spread across different tangible servers and that certain modules such as the media server 611 may be a separate component in communication with the modules of the communications server 320. It will further be appreciated that certain modules can be combined into a single module, for example, the CCM 510 and RM 607 may be combined into a more comprehensive CCM module. In other embodiments, the various components may be integrated into a single platform while maintaining their individual functionality and identity, such platform may be a single server or distributed applications.

In the example embodiment depicted by FIG. 6, a conventional phone client 601 calls a predetermined phone number to establish a phone connection over the PSTN, PBX or other conventional phone network. The inbound call is routed through a softswitch 602 to the signaling unit 603, which establishes a two-way call path with the conventional phone client 601. One or more gateways such as PSTN-to-SIP are included in the softswitch to allow SIP signaling with respect to conventional phone clients 601 utilizing conventional calling protocols (e.g., landline telephones and mobile telephones). In addition to SIP, any internet engineering task force (IETF) defined signaling protocol may be alternatively utilized. As the softswitch 602 opens the SIP communication, it collects and codes certain data such as location, time, etc. In addition, utilizing an API or other program, the functionality of the softswitch might be utilized on another platform.

In this example embodiment, an SIP signal from the softswitch 602 is communicated to a signaling unit 603. The integration unit 380, which includes the signaling unit 603, is a junction point that controls the connection between different calling parties utilizing conventional phone clients 601 and the multimedia production environment maintained by the hangout coordinator 400. The signaling unit 603 includes an IP telephony server, which is a SIP server in this example embodiment. The SIP server processes the signaling portion of a communication session and works in concern with transport protocols to provide content over the communication channel.

The CCB 605 acts as an analyzer and coordinator between the multimedia production environment and the signaling unit 603. The CCB 605 receives and determines certain identifier parameters from the conventional phone client 601 via the softswitch 602 and signaling unit 603, and the CCB 605 communicates call information to the CCM 510. The CCM 510 receives the call information from the CCB 605 and works together with the RM 607 to locate or generate an appropriate room ID (i.e., a "JID", which is analogous to a URL corresponding to the virtual hangout). It will be appreciated that for inbound calls that are new interactions with the multimedia production environment, a JID generally does not previously exist. In such cases, the CCM 510 sends a request for the RM 607 to generate a new JID and receives the newly generated JID back from the RM 607. With the JID established or located by the RM 607 and received at the CCM 510, CCB 605 sends its properly addressed content stream to a reflector 609 which manages media streaming. The JID also corresponds to a particular reflector 609 associated with the virtual hangout and is used by the CCB 605 to establish a connection between the signaling unit 603 and the particular reflector 609.

With respect to IP client devices 602, the one or more web servers 390 perform signaling with respect to the CCM 510 and RM 607 in order to retrieve appropriate JIDs for the IP client devices 602. The one or more IP client devices 602 also send call content to the reflector 609.

The reflector 609 receives content from several separate sources (e.g., from IP client devices 602, from conventional phone clients 601, and/or from media server 611) and buffers all incoming packets before synchronizing them and reordering them into various data sessions corresponding to each device connected to a virtual hangout. In the example embodiment, these data sessions (or "real-time" sessions) are RTP sessions that include multiple RTP streams. For example, an RTP session provided by the reflector 609 corresponding to a particular IP client device 602 includes all content received at the reflector except for the content received from that particular IP client device 602. Thus, the reflector 609 would provide an RTP session to that particular IP client device 602 including RTP streams received at the reflector from all other IP client devices 602, RTP streams received at the reflector from the CCB 605 corresponding to any conventional phone clients 601, and media content received from the media server 611 (where all the content of the RTP session corresponds to a particular virtual hangout that the particular IP client device 602 is participating in). It will be appreciated that other VoIP transport protocols other than RTP can also be used to transmit the call content and media content.

In another example, an RTP session provided by the reflector 609 corresponding to a particular conventional phone client 601 is sent to the CCB 605. The CCB 605 consolidates the multiple RTP streams of the RTP session into a consolidated audio RTP stream, for example, according to the G.711 standard. In one example embodiment, in the RTP session, the reflector provides only the audio RTP streams corresponding to call content from other devices and/or media content from the media server 611, and the CCB 605 consolidates those audio RTP streams into a consolidated audio RTP stream provided to the signaling unit 603 for transmission back to a particular conventional phone client 601. In another example embodiment, in the RTP session with respect to a particular conventional phone client 601, the reflector provides all content (except for the content originating from that particular conventional phone client 601) to the CCB 605 and the CCB 605 consolidates only audio RTP streams into the consolidated audio RTP stream that is provided to the signaling unit 603.

The CCM 510 sends control signals to the media server 611 to determine what resources the media server 611 sends to the reflector 609 for provision to the IP client device(s) 602 and conventional phone client(s) 601 via the RTP sessions. The media server 611 provides a variety of media resources, such as video content, that is provided to the reflector 609. The reflector 609 retrieves Session Description Protocol (SDP) information from the media server 611 and provides RTP streams to the CCB 605 (for conventional phone clients 601) and/or to the IP client devices 602.

Figure 7:
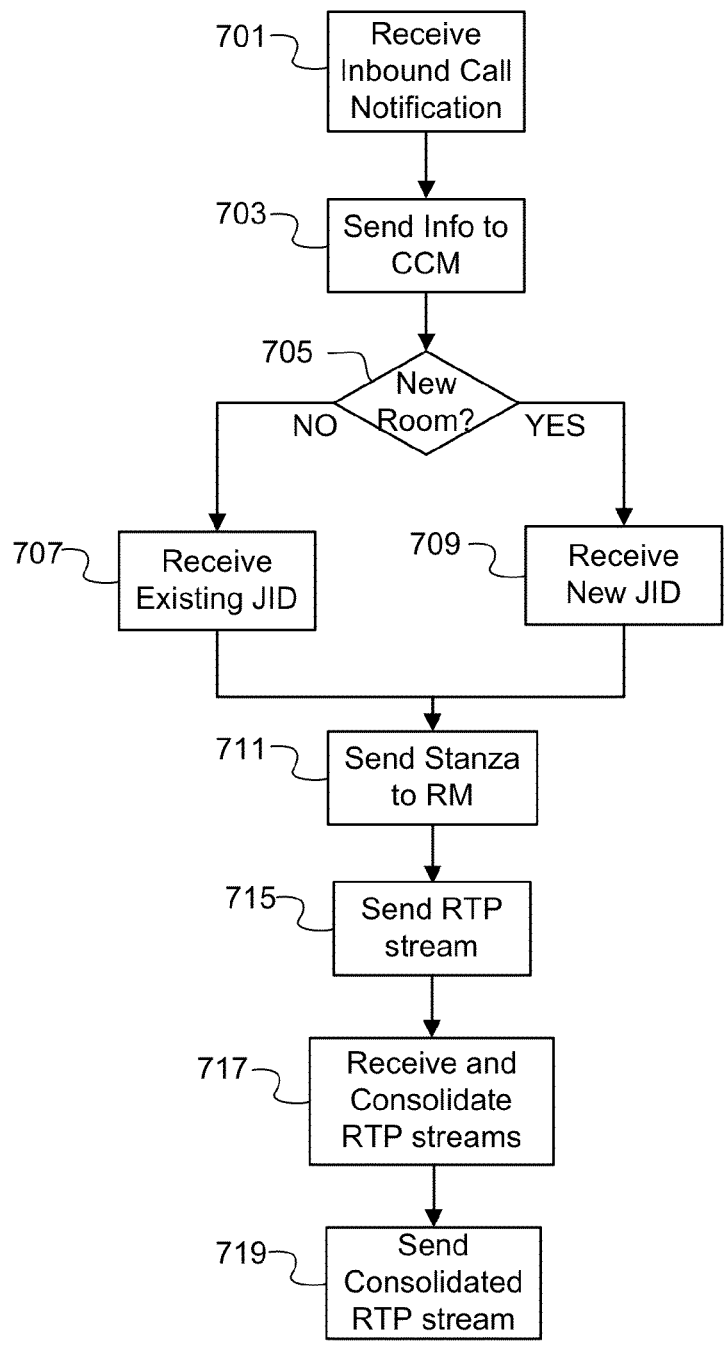
FIG. 7 is a flowchart illustrating the functions of an example Contact Center Bell (CCB) in the context of a process for integrating a call into the multimedia production environment according to an embodiment.

FIG. 7 is a flowchart 700 illustrating the role of the CCB 605 in the establishment of a communication channel between a conventional phone client 601 and the communications server 320. At stage 701, the CCB 605 is notified of an inbound call by the signaling unit 603, which has received an inbound call from the conventional phone client 601 via a softswitch 602. This notification may occur, for example, by way of a Remote Procedure Call (RPC) from the signaling unit 603 to the CCB 605. This RPC includes call information such as the dialed number and an Automatic Number Identification (ANI).

At stage 703, the CCB 605 transmits the call information to the CCM 510. The CCM 510, based on its rules engine, determines whether the incoming call needs a new virtual hangout room or whether the incoming call should be joined to an existing virtual hangout room based on the call information. Such call information can include nascent information such as the call number dialed and the time, or may include additional information such as room ID information and the like. Then, the CCM 510 sends a stanza (presence) to the RM 607 indicating that the CCM 510 is ready to receive a new or existing JID that corresponds to the determination made by the CCM 510. Thus, if a new room is not needed (see stage 705), the CCB 605 receives an existing JID from the CCM 510, which received the JID from the RM 607. If a new room is needed (see stage 705), the CCB 605 receives a new JID from the CCM 510, which received the JID from the RM 607. Then, the CCB 605 sends a stanza (presence) to the RM 607 indicating that the CCB 605 has associated the incoming call with the received JID. It will be appreciated that the stanzas sent to the RM may be sent according to conventional messaging protocols such as XMPP (eXtensible Messaging and Presence Protocol).

At stage 715, the CCB 605 sends an RTP stream coming from the signaling unit 603 onto the reflector 609. The content of the RTP stream originates from the conventional phone client 601, and for example, includes the audio content sent from the conventional phone client 601 to the signaling unit 603. The reflector 609 also receives resources from the media server 611, if appropriate according to management of the call session by the CCM 510. For example, if a streaming video from an external source is requested to be played in the virtual hangout room, the media server 611 provides the streaming video content to the reflector 609. At stage 717, the CCB 605 receives multiple RTP streams from the reflector 609 (such as audio or audio/video RTP streams originating from other conventional phone clients 601 and/or IP client devices 602 and RTP streams originating from the media server 611) and consolidates an appropriate set of the multiple RTP streams into a single consolidated audio RTP stream. For example, in one implementation, multiple audio RTP streams can be consolidated into a single consolidated audio RTP stream according to the G.711 standard. At stage 719, the consolidated audio RTP stream is then sent back to the signaling unit 603 and ultimately sent back to the conventional phone clients 601 for playback.

Figure 8:
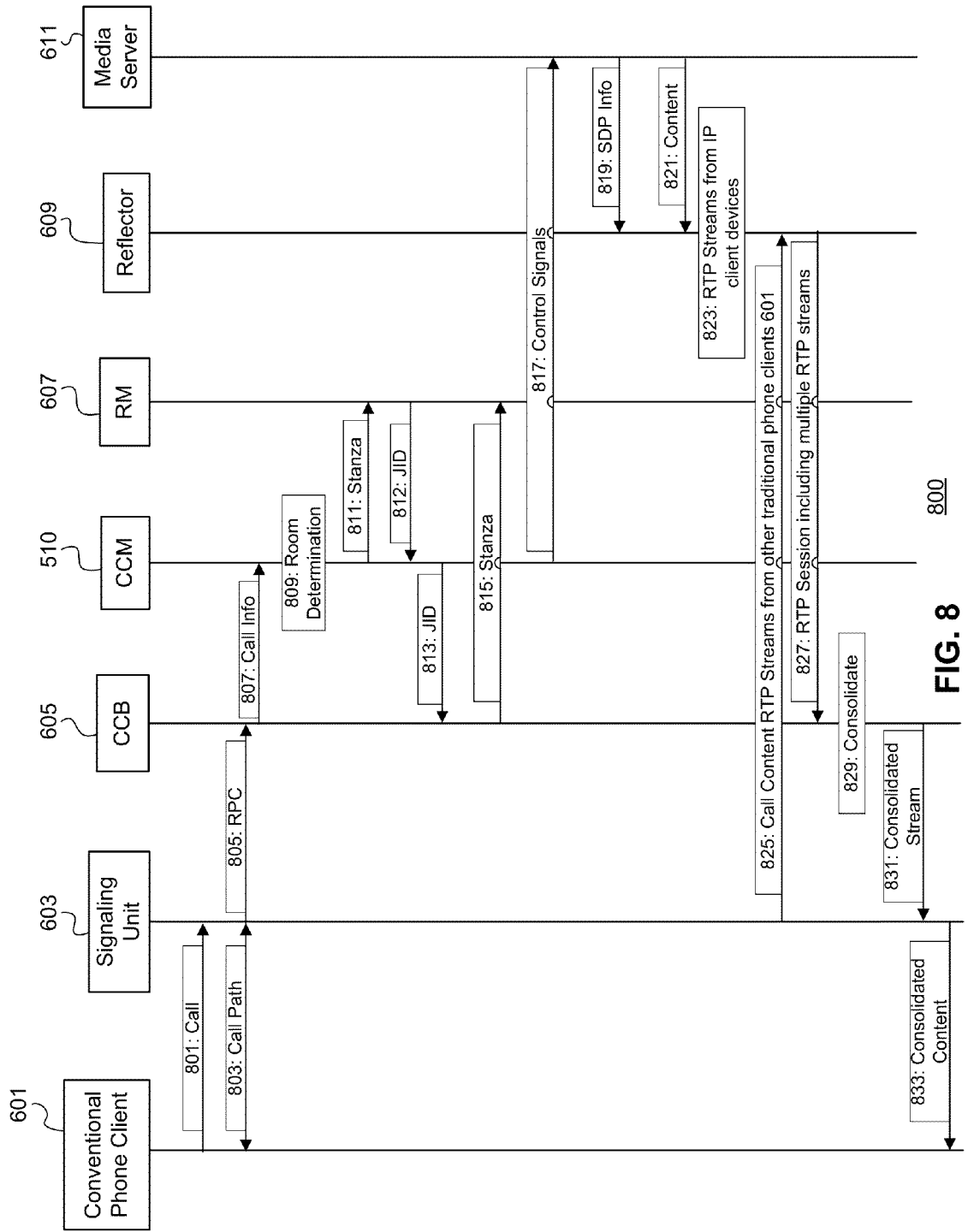
FIG. 8 is a flowchart illustrating the relationship between the components of the example system architecture depicted in FIG. 6 in the context of a process for integrating a call into the multimedia production environment according to an embodiment.

FIG. 8 depicts a process flow 800 illustrating the relationship between the elements of the architecture of FIG. 6 in the context of the communication channel establishment process described in FIG. 7. It will be appreciated that for simplicity of depiction, the softswitch 602 is omitted from FIG. 8. The process begins at stage 801 with a conventional phone client 601 sending an inbound call via the softswitch 602 to the signaling unit 603. As described above with respect to the example environment, this inbound call may be transmitted in response to a user input indicating that the user wishes to join or start a virtual hangout. At stage 803, the signaling unit 603 generates a two-way calling path with the conventional phone client 601. The signaling unit 603 also sends an RPC to the CCB 605 at stage 805 that provides the CCB 605 with the call information. At stage 807, the CCB 605 passes the call information to the CCM 510. At stage 809, the CCM 510 determines whether the call needs a new room or needs to be joined to an existing room, and at stage 811, the CCM 510 sends a stanza to the RM 607. At stage 812, the RM 607 returns a new or existing JID to the CCM 510 based on the determination by the CCM 510 at stage 809. At stage 813, the CCM 510 passes the JID to the CCB 605.

At stage 815, the CCB 605 sends a presence to the RM 607. Pursuant to control signals sent from the CCM 510 to the media server 611 at stage 817, the media server 611 sends SDP information to the reflector 609 at stage 819 and provides content to the reflector 609 at stage 821. The reflector also receives RTP streams from IP Client Devices 602 (see stage 823) and RTP streams corresponding to call content from other conventional phone clients 601 (see stage 825). At stage 827, the reflector 609 provides an RTP session to the CCB 605 that includes multiple RTP streams corresponding to content received by the reflector 609 at stages 821, 823, and 825.

At stage 829, an appropriate set of these multiple RTP streams received from the reflector 609 at the CCB 605 are consolidated by the CCB 605 into a single consolidated audio RTP stream. For example, for a particular conventional phone client 601, the CCB 605 consolidates all audio RTP streams corresponding to devices other than that particular conventional phone client 601 for transmission to that particular conventional phone client 601, and video RTP streams received from the reflector (if any) would not need to be included or sent with the consolidated audio RTP stream since the conventional phone client 601 is unable to play video content. At stage 831, the CCB 605 then sends the consolidated audio RTP stream to the signaling unit 603. At stage 833, the signaling unit 603 provides the content of the consolidated RTP stream to the conventional phone client 601 via a softswitch 602 (i.e., by converting it into a format compatible with the conventional phone client 601 and transmitting it to the conventional phone client 601).

It will be appreciated that the stages depicted in FIGS. 7 and 8 need not necessarily be performed in the order shown and certain stages may be performed in a different order or simultaneously. It will further be appreciated that certain stages need not constitute separate "steps" and that some of the stages may be ongoing once initiated.

Moreover, it will be appreciated that FIGS. 6-8 merely depict example embodiments of the present disclosure, and that the components and processing stages depicted therein may be modified, added, or removed in other embodiments. For example, the functionality of the modules could be combined into a single or smaller set of applications. Alternatively, the functionality of the applications and modules could be utilized from programs resting in other programs or platforms. In such case, an API accesses the modules for information and control transfer. In each module, functionality protocols could be modified to facilitate different forms of communications, control, and compression. For example, other protocols other than SIP and RTP may be utilized for signaling and transport, including but not limited to alternative protocols identified by IETF.

Further, the functionality of the various modules can be established in any number of manners such as proprietary and open source platforms, such as FreeSWITCH and others. For example, in one example embodiment, the signaling unit 603 may be implemented utilizing a FreeSWITCH application in combination with an Open SIPS server and a YATE server. In an alternative embodiment, the FreeSWITCH functionality can be adopted by another module to provide removal of the FreeSWITCH application.

As referenced, an example embodiment permits contact information to be sent to the conventional phone user by email or other forms of communication. In one such instance, the communications server 320 sends a text message or email with the contact information. In still other embodiments, the integration unit 380 can place an outgoing call to a phone number for the conventional phone client. 601. In such case, the communications server 320 receives a command initiate by a user 1, 1A or the like.

In the example embodiments, the various applications can be configured on any distributed or embedded platform within a single physical location or multiple locations. For example, the CCM may be resident on an individual and separate platform or may be embedded into the server platform. Similarly, some of the resources may reside on individual and separate platforms or they may be embedded into the server or other platforms. As such, embodiments contemplate that applications, resources, managers, servers, etc. may be joined or separated without diverging from their identities and functions. For example, a "server system" may include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A server system for providing virtual hangouts supporting connectivity with conventional client devices, the server system comprising:
   a signaling unit connected to a conventional phone network and configured to receive a conventional inbound phone call from a conventional phone client through the conventional phone network, the signaling unit configured to transform conventional phone signals received from the conventional phone client into an internet protocol (IP) phone signal stream;
   a web server configured to receive audio content from one or more IP-based client devices over an IP network; and
   a memory storing instructions that when executed implement:
      a contact center bell application connected to the signaling unit, the contact center bell application configured to produce a phone call identifying signal including identifying information particular to the conventional inbound call;
      a particular reflector corresponding to a virtual hangout, the particular reflector being one of a plurality of reflectors, wherein each reflector of the plurality of reflectors corresponds to a different virtual hangout, the particular reflector being capable of connecting with the contact center bell application to receive IP phone signal streams, the particular reflector further capable of combining the IP phone signal streams with at least one other multimedia signal stream and broadcasting combined multimedia signals in a real-time session to particular client devices corresponding to the virtual hangout; and
a contact center manager application connected to the contact center bell application, the contact center manager application configured to:
(a) receive the phone call identifying signal, wherein the identifying information particular to the conventional inbound call phone call identifying signal includes a dialed number that is dialed by the conventional phone client,
(b) process the phone call identifying signal to determine, based on the dialed number and a rules engine, whether the conventional inbound phone call needs a new virtual hangout room or whether the conventional inbound phone call should be joined to an existing virtual hangout room,
(c) receive, from a room manager application, an identification signal based on a result of determining whether the conventional inbound phone call needs a new virtual hangout room or whether the conventional inbound phone call should be joined to an existing virtual hangout room, and
(d) transmit to the contact center bell application the identification signal that identifies the particular reflector associated with the virtual hangout,
wherein the contact center bell is further configured to establish a connection between the signaling unit and the particular reflector associated with the virtual hangout based on the identification signal so that the IP phone signal streams are received by the particular reflector, combined with the at least one other multimedia signal streams, and broadcast to the particular client devices corresponding to the virtual hangout, wherein the at least one other multimedia signal streams includes at least one data stream of audio content that originated at a conventional phone client over the conventional phone network and at least one data stream of audio content that originated at an IP-based client over an IP network.

2. The system of claim 1, wherein the other multimedia signal streams comprise multimedia signal streams originating from a media server.

3. The system of claim 2, wherein the other multimedia signal streams originating from the media server are sent to the particular reflector based on control signals sent from the contact center manager application to the media server.

4. The system of claim 1, wherein the memory further stores instructions that when executed implement:
a room manager application residing on or in connection with the server system and connected to the contact center bell application and the contact center manager application, the room manager application being configured to transmit the identification signal that identifies the particular reflector associated with the virtual hangout to the contact center manager application.

5. The system of claim 4, wherein the contact center manager application and the contact center bell application are configured to send stanzas to the room manager application utilizing extensible messaging and presence protocol.

6. The system of claim 1, wherein the contact center bell application is further configured to consolidate the combined multimedia signals broadcasted from the reflector into a consolidated audio stream.

7. The system of claim 1, wherein the signaling unit is configured to communicate with the contact center bell application utilizing a remote procedure call.

8. The system of claim 1, wherein the identifying information particular to the conventional inbound call further includes an Automatic Number Identification (ANI).

9. The system of claim 1, wherein the signaling unit is further configured to perform call signaling according to Session Initiation Protocol (SIP).

10. The system of claim 9, wherein the signaling unit comprises an SIP server.

11. A method performed by a conventional phone client for integrating a conventional inbound phone call into a communications session within a multimedia production environment including a contact center manager, an integration unit, and a reflector, the method comprising:
transmitting a call request to the integration unit, wherein call information including a dialed number that is dialed by the conventional phone client is sent to the contact center manager, wherein the contact center manager is configured to determine, based on the dialed number and a rules engine, whether the inbound phone call needs a new virtual hangout room or whether the inbound phone call should be joined to an existing virtual hangout room, and receive from a room manager application a virtual hangout identification based on a result of determining whether the inbound phone call needs a new virtual hangout room or whether the inbound phone call should be joined to an existing virtual hangout room; and
connecting to the communications session, which corresponds to the virtual hangout identification received by the integration unit from the contact center manager based on the call information, wherein connecting to the communications session includes receiving audio content that includes a consolidated audio stream converted to a format compatible with the conventional phone client, wherein the consolidated audio stream includes audio content from a plurality of data streams received and processed by the reflector, wherein the data streams received by the reflector correspond to the virtual hangout identification, and wherein the plurality of data streams includes at least one data stream of audio content that originated at a conventional phone client over a conventional phone network and at least one data stream of audio content that originated at an Internet Protocol (IP)-based client over an IP network.

12. The method of claim 11, wherein the integration unit is further configured to be in communication with the contact center manager, and wherein the plurality of data streams is received from the reflector and consolidated into the consolidated audio stream by the integration unit.

13. The method of claim 11, wherein the plurality of data streams received by the reflector include at least one data stream corresponding to media content sent from a media server to the reflector.

14. The method of claim 11, wherein the consolidated audio stream is consolidated according to the G.711 standard.

15. The method of claim 11, wherein the call information further includes an Automatic Number Identification (ANI).

16. A non-transitory computer-readable medium within a communications server having computer-executable instructions for integrating conventional phone calls into virtual hangouts within a multimedia production environment, the computer-executable instructions, when executed by a processor, causing a contact center bell application to perform the steps of:
receiving call information corresponding to an incoming conventional phone call from a conventional phone client;

sending the call information including a dialed number that is dialed by the conventional phone client to a contact center manager, wherein the contact center manager is configured to determine, based on the dialed number and a rules engine, whether the incoming conventional phone call needs a new virtual hangout room or whether the incoming conventional phone call should be joined to an existing virtual hangout room, and receive from a room manager application a virtual hangout identification based on a result of determining whether the incoming conventional phone call needs a new virtual hangout room or whether the incoming conventional phone call should be joined to an existing virtual hangout room;

receiving the virtual hangout identification from the contact center manager;

transmitting a data stream received from a signaling unit to a reflector, wherein the data stream includes call content of the incoming conventional phone call;

receiving a plurality of data streams from the reflector, wherein the plurality of data streams includes at least one data stream of audio content that originated at a conventional phone client over a conventional phone network and at least one data stream of audio content that originated at an Internet Protocol (IP)-based client over an IP network;

consolidating a set of the plurality of processed data streams received from the reflector into a consolidated audio stream; and, transmitting the consolidated audio stream to the signaling unit.

17. The non-transitory computer-readable medium of claim 16, wherein the computer-executable instructions, when executed by a processor, further cause the contact center bell to perform the step of:

sending a stanza to a room manager utilizing eXtensible Messaging and Presence Protocol (XMPP).

18. The non-transitory computer-readable medium of claim 16, wherein the plurality of data streams received from the reflector include at least one data stream corresponding to media content sent from a media server to the reflector.

19. The non-transitory computer-readable medium of claim 16, wherein the consolidated audio stream is consolidated according to the G.711 standard.

20. The non-transitory computer-readable medium of claim 16, wherein the call information further includes an Automatic Number Identification (ANI).

* * * * *